United States Patent Office 3,223,594
Patented Dec. 14, 1965

3,223,594
METHOD OF PRODUCING PANCREATIN
Serge Hoek, Van Houtenlaan, Weesp, Netherlands, assignor to North American Philips Company, Inc., New York, N.Y., a corporation of Delaware
No Drawing. Filed Oct. 23, 1961, Ser. No. 147,091
Claims priority, application Netherlands, July 21, 1961, 257,268
4 Claims. (Cl. 195—68)

The invention relates to a method of producing pancreatin from the pancreata of ordinary slaughter beasts, for example cows or pigs.

Pancreatin is a ferment preparation containing a plurality of proteins, starch and fat splitting enzymes and used in techniques, in the textile and rubber industry, in tanneries and in pharmacy and in the foodstuff industry.

In a known method of producing such an active, enzyme-containing preparation from pancreas the whole gland is dehydrated and degreased by means of a suitable organic solvent, usually acetone, after which it is dried and ground. This pancreatin, also termed an "acetone dry powder" has a comparatively low activity owing to the presence of a large quantity of inactive constituents. Moreover, it is not easy to grind the fibrous material of the pancreas to a high degree of fineness or to sieve it from the powder.

In a further known method the pancreas is extracted with a solvent in which the enzymes dissolve. The solvent is in this case water, since in this case, indeed, an enzyme mixture containing the enzymes characteristic of pancreatin in the natural ratio can be extracted. After the removal of solid constituents from the extract, approximately the same volume or a greater volume of acetone is added to the aqueous liquid, the pancreatin being thus precipitated, so that it can be collected by filtration or centrifugation. In this manner pancreatin having approximately four times the activity of the acetone drier can be produced.

The last-mentioned method, however, can be carried out on an industrial scale only with great difficulties, since the pancreas has to be ground in order to obtain a satisfactory extraction and after mixing this ground pancreas a pulp is obtained, of which the solid constituents, the mucines and the fats can be separated only with great difficulty. Each filter gets stopped up both in filtering and centrifuging and even with the use of a pressure filter the liquid is drained off with difficulty and a considerable part of the enzymes is left in the slimy filter cake.

It has therefore been suggested to carry out the two high activity can be obtained by a simple process subseaforesaid methods one after the other by producing first an "acetone dry powder" which is subsequently extracted with water, the solid constituents being then removed from the extract and the pancreatin being precipitated again with acetone. Although in this manner a preparation with a very high activity can be obtained, this method is too circuitous and too costly for the production of a cheap agent such as pancreatin.

It has now been found that such preparations with quent to extraction with water of ground pancreas from the pulp obtained.

It was a surprise to find that, when the quantity of acetone required for the precipitation of the enzymes from the aqueous extraction is directly added to the aqueous pulp, so that the initially dissolved enzymes are again precipitated between the inactive, solid constituents floating in the liquid, the inactive constituents can be separated from the enzyme suspension in a simple manner. By the addition of acetone the fats are dissolved to a sufficient extent to permit further processing and the mucines are denatured. Apart from the enzymes fibrous constituents remain suspended in the liquid mixture. It was remarkable to find that these fibrous substances, initially formed by very short fibres which can be separated from the mass only with great difficulty, form threads in this liquid medium, when stirred, so that the longer threads can be removed readily from the liquid.

In accordance herewith the present invention relates to a method of producing pancreatin from the pancreata of slaughter beasts, the glands being extracted with water and is characterized in that prior to the removal of solid constituents, such a quantity of acetone is added to the aqueous extraction pulp thus obtained that enzymes are precipitated from the aqueous solution, the fibres being removed from the liquid after stirring for some time, the solid parts being subsequently collected from the suspension left and being washed and dried.

Prior to the extraction with water the pancreas is usually ground in a mincing machine. Then an at least equal volume, preferably a one and a half times or twice greater volume of water is added and, if desired, an enzyme activator, for example enterokinase is also added.

Then the mass is thoroughly stirred for some time, for example from 30 minutes to a few hours, for instance with the aid of an agitator of which the shape is chosen so that no threads of the liquid can wind themselves round it. Use may be made, for example, of an agitator having a smooth stem, on which curved stirring elements are arranged. Then, in accordance with the invention, acetone is added to the pulp, the quantity thereof being, as a rule, such that the acetone concentration in the fluid amounts to at least 35%. If desired, a lower acetone concentration could be used, for example down to 20%, but in this case the whole quantity of enzymes is not precipitated, so that afterwards more acetone has to be added in order to separate the precipitated pancreatin from the liquid, in order to obtain pancreatin with the correct enzyme ratio. The acetone concentration is preferably 50 to 65%, since in this case a particularly satisfactory pancreatin is obtained. Higher acetone concentrations may be used, but the method according to the invention does not require such a consumption of organic liquid, so that this would not be economical.

After the mixture has been stirred for some time, for example 20 to 60 minutes, long fibrous threads are formed in the suspension and may be removed from the mixture, for example with the aid of a fork. Rods, for example shape in the form of a grid, a fork or a frame, are preferably introduced into the fluid, the fibrous threads winding themselves around them during stirring. Thus simply by lifting the rods out of the fluid the fibres can be removed from the fluid; the fibrous mass is then compressed. If desired, the fibrous mass may be washed subsequently with water and the washing liquid may be added to the enzyme suspension.

The fibre-free suspension may then be processed by known methods, the solid constituents being separated out for example by centrifugation or filtration; after washing with acetone, if desired, the filter cake is dried, if desired after a last washing with an organic liquid miscible with acetone, for example petroleum ether or methylethylketone.

In this way a pancreatin preparation is obtained, which has about eight to twelve times the enzyme activity indicated in the National Formulary, 10th edition, and the British Pharmacopoeia, 1958.

*Example*

100 kgs. of pig pancreas was refined in a mincer and 150 litres of water was added. The mixture was extracted for one hour at room temperature, while the mass was stirred for one hour with the aid of an agitator formed by a round metal rod, arranged vertically in the centre of the circular vessel and provided near the bottom of the vessel with curved, round, horizontal transverse rods. Then, while stirring, 388 litres of 98% by volume of acetone was added, so that the acetone concentration was about 60%.

A fork of smooth metal rods was arranged obliquely to just above the arms of the agitator in the liquid; the whole quantity of fibrous material of the liquid was collected thereon within half an hour. The fork was then lifted out of the liquid, the fibres were slipped off and compressed and the juice obtained was added to the extract.

The fibre-free suspension was subjected to centrifugal force and the pancreatin cake was washed subsequently with acetone and then dried. Thus 11 kgs. of pancreatin was obtained, which had an enzyme activity which was 10 times the activity prescribed in the National Formulary, 10th edition, fixed in the manner described therein, the lipase activity being 17 times that prescribed in the British Pharmacopoeia 1958, fixed by the method indicated therein.

What is claimed is:

1. The process of obtaining pancreatin from the pancreata of slaughter beasts which method comprises finely dividing a pancreas, adding at least an equal volume of water to the finely divided pancreas, stirring said mixture of water and finely divided pancreas with an agitator in a manner such that substantially no fibres adhere to the agitator, adding acetone to said mixture in an amount of at least 20% of the total amount of fluids present while continunig to stir said mixture, continuing further to stir said mixture by lifting substantially all fibres from said mixture, removing the solids from the resultant fibre free mixture and drying said solids thereby obtaining pancreatin.

2. The process of claim 1 wherein sufficient acetone is added to the water-pancreas mixture so that the acetone concentration is at least 35% by volume of the total amount of fluids present.

3. The process of claim 1 wherein sufficient acetone is added to the water-pancreas mixture so that the acetone concentration is 50 to 65% by volume of the total amount of fluids present.

4. The process of claim 1 wherein the fibres are removed by the introduction into the acetone containing mixture of an apparatus of a configuration such that the fibres adhere and the removal of this apparatus with the adhering fibres from the said mixture.

References Cited by the Examiner

UNITED STATES PATENTS

| | | | |
|---|---|---|---|
| 2,069,019 | 1/1937 | Schultz | 167—75 X |
| 2,477,541 | 7/1949 | Ivy et al. | 167—74.1 |
| 2,803,585 | 8/1957 | Fredericksen | 167—75 |

FOREIGN PATENTS 573,681  4/1959  Canada.

FRANK CACCIAPAGLIA, JR., *Primary Examiner.*